March 21, 1967  S. G. PESCHEL  3,310,735
APPARATUS FOR TESTING THE INSULATION OF ELECTRICALLY INSULATED
WIRES INCLUDING A PLURALITY OF CONDUCTIVE RESILIENT
ELEMENTS SUPPORTED BETWEEN A PAIR OF SPACED
RINGS FOR CONTACTING THE INSULATION OF
THE WIRES UNDER TEST
Filed Jan. 28, 1964  2 Sheets-Sheet 1

INVENTOR.
STANLEY G. PESCHEL
BY
Curtis, Morris and Safford
ATTORNEYS

March 21, 1967

S. G. PESCHEL 3,310,735

APPARATUS FOR TESTING THE INSULATION OF ELECTRICALLY INSULATED
WIRES INCLUDING A PLURALITY OF CONDUCTIVE RESILIENT
ELEMENTS SUPPORTED BETWEEN A PAIR OF SPACED
RINGS FOR CONTACTING THE INSULATION OF
THE WIRES UNDER TEST

Filed Jan. 28, 1964

INVENTOR.
STANLEY G. PESCHEL

BY
Curtis, Morris and Safford
ATTORNEYS

United States Patent Office 3,310,735
Patented Mar. 21, 1967

3,310,735
APPARATUS FOR TESTING THE INSULATION OF ELECTRICALLY INSULATED WIRES INCLUDING A PLURALITY OF CONDUCTIVE RESILIENT ELEMENTS SUPPORTED BETWEEN A PAIR OF SPACED RINGS FOR CONTACTING THE INSULATION OF THE WIRES UNDER TEST
Stanley G. Peschel, 12 Bloomer Road, Brewster, N.Y. 10509
Filed Jan. 28, 1964, Ser. No. 340,698
4 Claims. (Cl. 324—54)

The present invention relates to insulated wire test apparatus adapted to have a supply of wire passed through the test apparatus to determine whether there are any faults in the insulation covering on the wire.

Among the many advantages of the test apparatus of the present invention are those resulting from the fact that this apparatus is capable of testing a wide range of sizes of wire without requiring adjustment of the apparatus. As the wire is passed through the apparatus, a high voltage stress is imposed between the conductor core of the wire and a conductive electrode structure which closely embraces the insulation. Regardless of the diameter of the insulation, this conductive electrode structure closely embraces the insulation in actual contact therewith so as to assure that all points of the insulation are subjected to the same high stress, thus providing a thorough test of the insulation.

An additional advantage of this test apparatus is that it will accommodate the passage of kinks or knots in the wire being tested without snagging. The conductive electrode structure closely embraces the insulation being tested and yet will allow kinks or knots to pass freely through itself.

A further advantage of the illustrative embodiment of the test apparatus is that it enables the insulated wire to be engaged in operating position within the conductive electrode structure without requiring that the free end of the wire be threaded through it. By a quick convenient movement the conductive electrode structure can be opened up so as to receive a length of wire inserted therein from a lateral position, and then immediately the electrode structure can be closed about the wire in readiness for running a test.

It is an object of the present invention to advance the art of testing the insulation covering on wires.

A further object of this invention is to provide improved insulated wire test apparatus having several advantages in operation.

In this specification and in the accompanying drawings is described and shown insulated wire test apparatus embodying this invention, and it is to be understood that this disclosure is not intended to be exhaustive nor limiting of the invention, but is set forth for purposes of illustration in order that others skilled in the art may fully understand the invention and the manner of its application in practical use under widely varying test conditions and installations.

The various objects, aspects and advantages of the present invention will be in part more fully pointed out and in part will be understood from the following description of an illustrative embodiment of the invention, when considered in conjunction with the accompanying drawings, in which.

Figure 1:
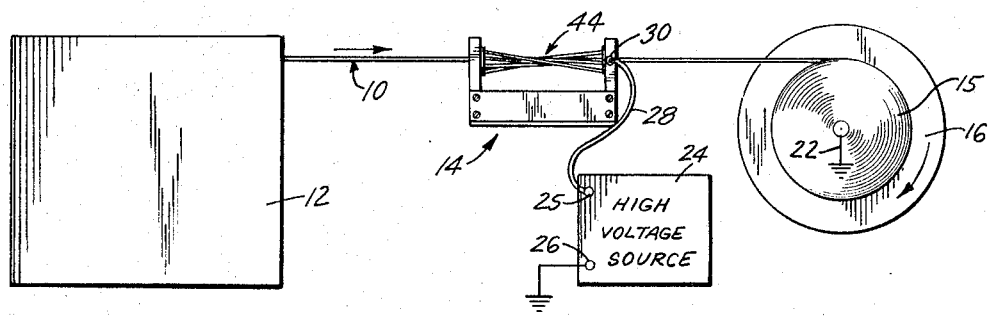
FIGURE 1 is an illustration of an installation for testing insulated wire embodying the present invention.

As shown in FIGURE 1, an insulated wire 10 to be tested is fed from a suitable supply mechanism 12, for example such as a wire insulating machine and the wire 10 is pulled through a test apparatus 14 then being wound up in a coil 15 on a reel 16. This insulated wire 10 includes a conductor core 18 (FIURE 3) and an insulation covering 20. As shown the conductor core 18 comprises a single solid wire strand, but it is to be understood that this core 18 may comprise one or more wire strands surrounded by an insulation covering. Also, the insulated wire 10 itself may comprise more than one insulated wires in a group, for example such as a twisted pair of individually insulated wires. In fact, it is an advantage of the test apparatus of the present invention that it operates very well in testing a twisted pair of individually insulated wires. Accordingly, the term "insulated wire" is intended to include the various types of insulated wire material above mentioned.

In operation the conductor core 18 of the wire being tested is suitably grounded as indicated by the ground symbol 22. This ground connection may be made at the reel 16 or at the wire supply mechanisms 12 or both, whatever arrangement is convenient, and a high voltage stress is imposed on the insulation covering 20 to determine whether any faults are present in the insulation. The test voltage is supplied from a suitable high voltage output power supply source 24, for example which is capable of delivering up to 10,000 volts direct-current or alternating-current potential between its terminals 25 and 26. The terminal 26 is grounded, and the terminal 25 is connected through an insulated cable 28 to a high potential terminal 30 of the test apparatus 14.

Figure 2:
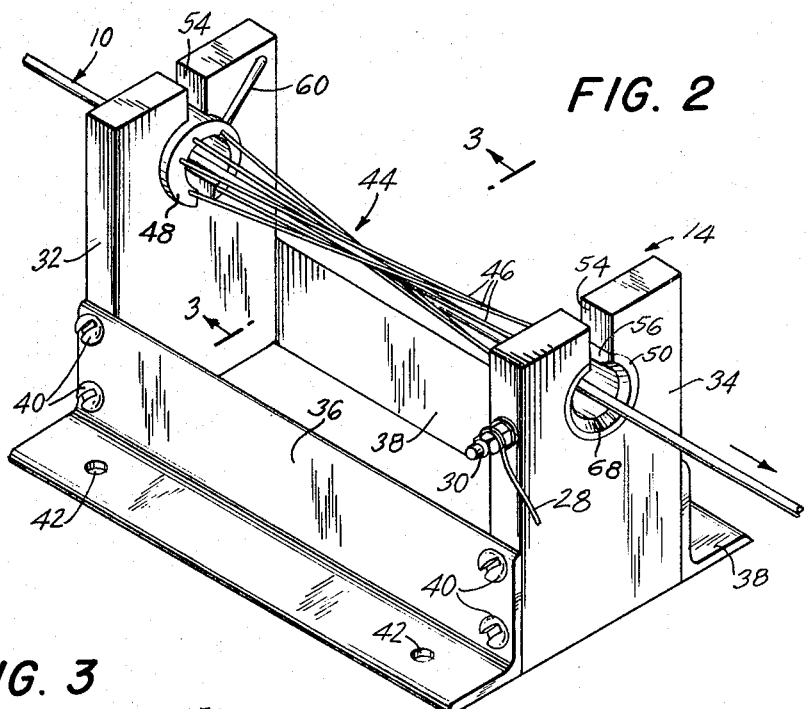
FIGURE 2 is a perspective view of the test apparatus in operative position with the conductive electrode structure closely embracing an insulated wire being tested.
Figure 4:
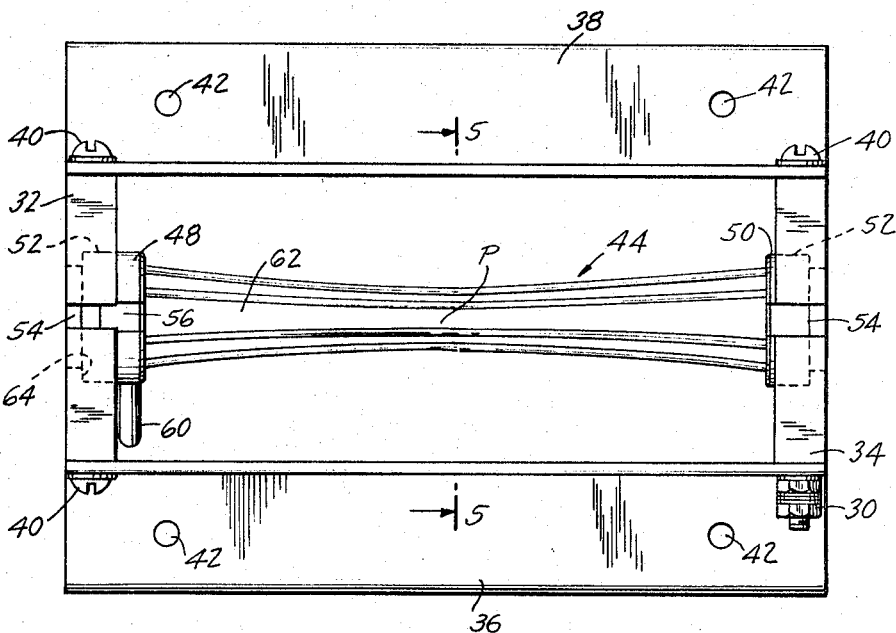
FIGURE 4 is a plan view of the test apparatus of FIGURE 2 and being shown in open position for receiving the wire to be tested.

As seen most clearly in FIGURES 2 and 4, the illustrative test apparatus 14 includes a pair of upstanding insulation supports 32 and 34 in spaced aligned relationship secured to a pair of frame members 36 and 38 by suitable fastening means shown as machine screws 40. The lower flanges of the frame members 36 and 38 include mounting holes 42. The support members 36 and 38 are formed of suitable rigid dielectric material, for example such as fabric-reinforced phenolic and urea resins, e.g. "Formica" and methyl methacrylate, e.g. "Lucite," "Plexiglas."

Figure 6:
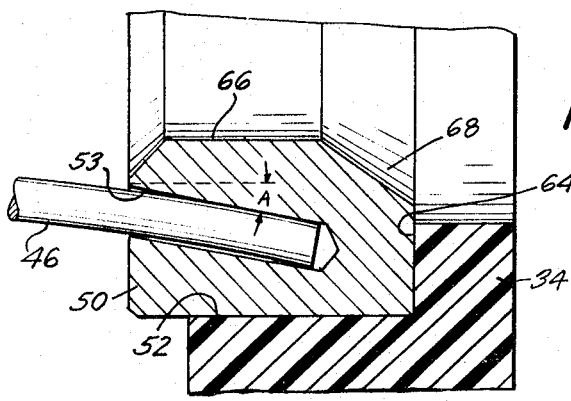
FIGURE 6 is a partial sectional view taken along the line 6—6 of FIGURE 5.

In order to surround the wire 10 in resilient contact therewith for applying the test voltage stress to all points of the insulation covering 20, the test apparatus 14 includes a conductive electrode structure 44 including a plurality of stiffly flexible spring wire elements 46 extending between a pair of C-shaped end rings 48 and 50 which are mounted in round seats 52 in the respective insulation supports 32 and 34. In test apparatus for the larger insulated wire, for example such as insulated cable having an outside diameter in the range from ½ inch up to 3 inches; these end rings 48 and 50 are complete circles, and the end of the wire is initially threaded through the test apparatus 14. As shown in FIGURE 6, the ends of the spring wire elements 46 fit into sockets 53 formed by drill holes in the opposed faces of the respective end rings 48 and 50, and these sockets 53 are slightly larger in diameter than the wire elements 46.

For purposes of conveniently inserting a length of wire 10 into the electrode structure 44 of the illustrative embodiment of the invention without the necessity of threading an end of the wire through the test apparatus 14, there is a lateral opening or slot 54 in each of the insulation supports 32 and 34. Each end ring has a corresponding lateral opening or loading gap 56 therein. However, as mentioned above the test apparatus 14 for testing larger diameter insulated wire and insulated cable may utilize end rings 48 and 50 without any lateral loading gap 56 therein.

Figure 5:
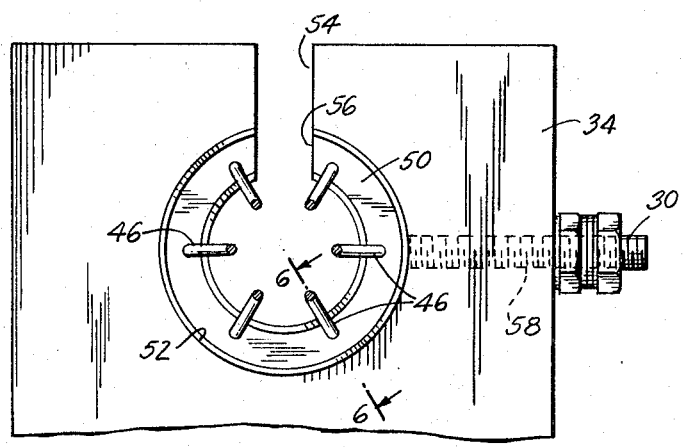
FIGURE 5 is a cross sectional view taken along the line 5—5 of FIGURE 4 and shown on the same enlarged scale as FIGURE 3.

As shown in FIGURE 5, the shank 58 of the terminal 30 is connected to the end ring 50 and anchors this terminal stationary in its seat 52 with its loading gap 56 in line with the slot opening 54, as seen also in FIGURES 2 and 4. The other end ring 48 is rotatable in its socket 52 and includes an operating finger 60 for turning it to the loading position (dead-center) position as shown in FIGURE 4 wherein the gap 56 aligns with the slot 54. When the movable end ring 48 is rotated into its loading position, all of the stiffly flexible wire elements 56 become spaced apart and become bowed into curves as shown in FIGURE 4, thus providing an unobstructed loading space 62 extending the full length of the electrode structure 44. Thus, the wire 10 to be tested can be conveniently lowered into clearance space 62 along the length of this space 62 or alternatively can conveniently be threaded axially through the test apparatus 14.

Figure 3:
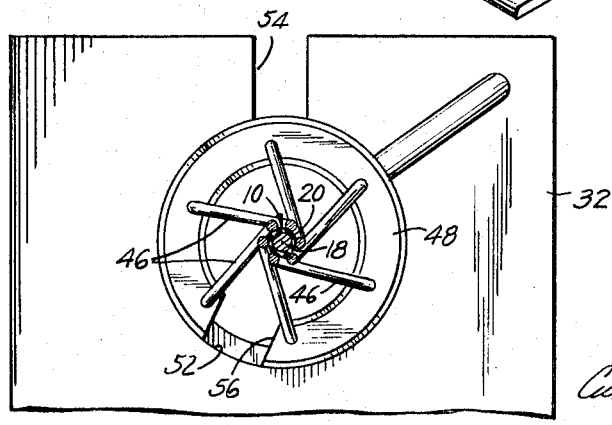
FIGURE 3 is a cross sectional view taken along the line 3—3 of FIGURE 2 and shown on enlarged scale.

To place the test apparatus 14 into operating position the finger 60 is moved slightly in either clockwise or counterclockwise direction away from the loading (dead-center) position, and immediately the action of the spring wire element 46 causes the end ring 48 to continue turning in this direction until the wire elements 46 are gently embracing the insulation covering 20. In effect, when the end ring 48 is in its loading position it is in unstable equilibrium with respect to the spring action of the bowed wire elements 46. These wire elements are straight when they are in their relaxed position and they become forced into a curve by virtue of the fact that the sockets 53 are convergent inwardly toward a point P seen in FIGURE 4 located on an axial line through the electrode structure 44 and located near the center of this structure. Consequently, when the finger 60 is moved in either direction away from the loading (dead-center) position, the spring wire elements 46 unflex themselves and turn the movable ring element 48 around to the closed position wherein the elements 46 are substantially straight and are in engagement with the insulation covering 20 as shown in FIGURES 2 and 3. An internal shoulder 64 (FIGURE 4) in the support 32 prevents the ring 48 from shifting out of the support in an axial direction.

During operation, if a kink or knot in the test wire 10 starts to pass through the electrode structure 44 it acts as a moving cam so as to urge the spring wire elements 46 outwardly away from the axis. This also causes the ring 48 to turn somewhat so as to increase the spacing between the elements 46 thus accommodating passage of any lateral projections of the knot. As soon as the knot has passed the midpoint P, immediately the wire elements 46 spring back to the position shown in FIGURE 3.

The spring wire elements 46 are formed of suitable stiffly flexible springy conductive material, for example such as stiff wires of beryllium bronze, stainless steel, spring steel, and the like. To increase the life of these wire elements 46 they may advantageously be made of a very hard wear-resistant alloy steel, for example such as nitrided vanadium steel.

The effective contact force exerted by the spring wire element 46 against the insulation 20 is increased by increasing the stiffness of these wires, for example by increasing their diameter. Also, this force is increased for a given length of test apparatus by increasing the angle A of convergence of the sockets 53 toward the axis of the electrode structure 44. It will be appreciated from the geometrical relationships shown in FIGURE 3 that when six spring wire elements 46 are used, then the diameter of these elements 46 must be no greater than the outer diameter of the wire insulation 20 as that the elements 46 can all touch the insulation 20. For testing larger insulated wire and cable for example up to 3 inches or more in diameter, then the test electrode may include a larger number of elements 46 as may be convenient, for example such as sixteen.

The high voltage source 24 includes an alarm device which produces both an audible and a visual signal if there is a fault in the insulation 20 which causes a low impedance to appear between the test terminal 30 and the conductor core 18. If desired, the moving test wire 10 may be stopped automatically when a fault is found.

It is noted that each of the end rings 48 and 50 is made of electrically conductive material, for example of metal such as aluminum, brass, stainless steel and the like, so as to interconnect all of the elements 46. Thus, all parts of the electrode structure 44 are at the same voltage during a test. For ease of movement of the test wire through the axial openings 66 of the end rings 48 and 50, these openings are flared outwardly to form a bell mouth 68.

Also, it is noted that the plurality of conductive elements 46 when in their closed operating position as shown in FIGURES 1, 2 and 3 are approximately straight and are skewed about the axial line which is occupied by the test wire 10. These elements 46 are approximately tangent to conical surfaces and converge to define a small throat at the mid-point of the electrode structure, with the wire 10 passing through this throat as seen in FIGURES 1-3. From a geometrical point of view, these conductive elements 46 may be considered to lie generally along spaced lines of a family of lines defining a hyperboloid of revolution about the axial line. When the electrode structure is in its opened position, then each conductive element 46 is bowed and lies in a plane containing, i.e. common with, the central axial line.

A very effective test apparatus for testing insulated wire having an O.D. up to 7/16 of an inch has been made which is 7½ inches long over-all and wherein the inner open ends of the respective sockets 53 are spaced from the axis by a radial distance of 15/16 of an inch and the angle A is 7.5° when using a wire element 46 having a diameter of 5/64. It is found to be desirable to have the inside diameter of the end rings 48 and 50 approximately twice the O.D. of the largest size of wire to be tested in the apparatus 14. Thus, for example these end rings have an I.D. of 6 inches for testing insulated wire having an O.D. in the range from ½ inch to 3 inches.

From the foregoing it will be understood that the insulated wire test apparatus described herein as an illustrative embodiment of the present invention is well suited to provide the advantages set forth, and since many possible embodiments can be made of the various features of this invention and as the apparatus described herein may be varied in various parts, all without departing from the scope of the invention, it is to be understood that all matter hereinbefore set forth or shown in the accompanying drawings is to be interpreted as illustrative and not in a limiting sense and that in certain instances some of the features of the invention may be used without a corresponding use of other features or may be modified into equivalent elements, all without departing from the scope of the invention as defined by the following claims.

What is claimed is:

1. Apparatus for testing the insulation covering on insulated wires comprising a pair of insulated supports, frame means for holding said supports in spaced aligned relationship, a pair of C-shaped end rings mounted on said respective insulated supports defining an axial line extending through the axial openings of said rings, each of said C-shaped rings having a lateral slot for loading insulated wire to be tested therein, one of said rings being rotatable about said axial line, a plurality of sockets in the opposed surfaces of each of said end rings spaced uniformly about said axial line, said sockets converging inwardly toward said axial line, a plurality of straight resilient wire elements having their opposite ends fitting into corresponding sockets in the respective end rings, said sockets being slightly larger in diameter than said wire elements, and said wire elements being bowed into curves convex toward said axial line when said lateral slots are aligned, urging said rotatable ring to revolve about said axial line until said wire elements are substantially straight and are approximately tangent to conical surfaces and converge to define a small throat near the mid-point between said C-shaped rings for embracing the insulated wire to be tested, and terminal means connected to one of said end rings for connecting a high voltage source thereto.

2. Apparatus for applying a test voltage to test the insulation covering on insulated wires comprising a pair of insulated supports each having a round seat therein with a slot extending inwardly from the exterior of the support to said seat, frame means for holding said supports with said seats in spaced aligned relationship, a pair of C-shaped conductive end rings each mounted in one of said seats in a respective one of said insulated supports defining an axial line extending through the centers of said rings, one of said rings being rotatable in its seat about said axial line for bringing the gap in said rotatable end ring into loading position in register with the slot in its support, the other ring having its gap in register with the slot in its support, a plurality of sockets in the opposed surfaces of each of said end rings spaced uniformly about said axial line, said sockets in each ring converging inwardly toward said axial line, a plurality of straight resilient conductive spring elements having their opposite ends fitting into said sockets and each being bowed convex inward toward said axial line and lying in a plane in common with said axial line when the gap in said rotatable end ring is in said loading position, said sockets being slightly larger in diameter than said ends of said straight spring elements, whereby said straight spring elements urge said rotatable ring to rotate about said axial line until said spring elements are substantially straight and approximately tangent to conical surfaces and converge to define a small throat near the mid-point between said end rings for embracing an insulated wire extending along said axial line, and terminal means connected to one of said end rings for connecting a test voltage source thereto.

3. Apparatus for applying a test voltage to test the insulation covering on insulated wires comprising a pair of insulated supports each having a round seat therein, frame means for holding said supports with said seats in spaced aligned relationship, a pair of C-shaped conductive end rings each mounted in one of said seats in a respective one of said insulated supports defining an axial line extending through the centers of said rings, one of said rings being rotatable in its seat about said axial line for bringing the gap in said rotatable end ring into a loading position in alignment with the gap in the other ring, a plurality of sockets in the opposed surfaces of each of said end rings spaced uniformly about said axial line, said sockets in each ring converging inwardly toward said axial line, a plurality of straight resilient conductive elements having their opposite ends fitting loosely into said sockets and each being bowed and lying in a plane in common with said axial line when the gap in said rotatable end ring is in said loading position, said elements urging said rotatable ring to rotate about said axial line until said elements are substantially straight and lying generally along skewed lines defining a hyperboloid of revolution about said axial line having a constricted throat, when said rotatable end ring is tuned away from its loading position into its operating position, and terminal means connected to one of said end rings for connecting a test voltage source thereto.

4. Test electrode apparatus for applying a high voltage test to insulation covering surrounding wires comprising a pair of insulated supports each having a round seat therein, frame means for holding said supports with said seats in spaced aligned relationship, a pair of axially aligned end rings each mounted in one of said seats in a respective one of said insulated supports defining an axial path extending through the centers of said rings, one of said rings being rotatable in its seat about said axial path, a plurality of sockets in the opposed surfaces of said rings converging inwardly toward a point on said axial path, a plurality of stiff conductive elements having their opposite ends inserted into the corresponding sockets in the respective end rings, said elements each being bowed convex inward toward said axial path when said rotatable ring is rotated about said axial path into its loading position and urging said rotatable ring to rotate about said axial path into its operating position in which said elements lie generally along skewed lines defining a hyperboloid of revolution about said axial path having a constricted throat, and terminal means connected to one of said end rings for connecting a test voltage source thereto.

References Cited by the Examiner

UNITED STATES PATENTS

| 2,485,871 | 10/1949 | Entwistle | 324—54 |
| 2,894,204 | 7/1959 | Gambrill | 324—54 |

FOREIGN PATENTS

| 831,420 | 2/1952 | Germany. |

WALTER L. CARLSON, *Primary Examiner.*

G. R. STRECKER, *Assistant Examiner.*